(12) United States Patent
Oueslati et al.

(10) Patent No.: US 6,332,770 B1
(45) Date of Patent: Dec. 25, 2001

(54) APPARATUS FOR LOCALIZED PREFORM COOLING OUTSIDE THE MOLD

(75) Inventors: Faisal Oueslati, Mississauga; Tiemo Brand, North York, both of (CA); Witold Neter, Newnan, GA (US)

(73) Assignee: Husky Injection Molding Systems, Ltd., Bolton (CA)

( * ) Notice: Subject to any disclaimer, the term of this patent is extended or adjusted under 35 U.S.C. 154(b) by 0 days.

(21) Appl. No.: 09/328,798

(22) Filed: Jun. 9, 1999

(51) Int. Cl.[7] .................................................... B29C 45/72
(52) U.S. Cl. ......................... 425/547; 264/237; 264/348; 425/548; 425/446
(58) Field of Search .............................. 249/79; 425/547, 425/526, 548, 540, 437, 556, 446, 519, 520; 264/538, 237, 348

(56) References Cited

U.S. PATENT DOCUMENTS

| | | | |
|---|---|---|---|
| 4,667,729 | * | 5/1987 | Zecman ................................. 164/312 |
| 5,290,506 | * | 3/1994 | Yokobayashi ........................ 264/520 |
| 5,498,150 | * | 3/1996 | Check .................................... 425/526 |
| 5,762,970 | * | 6/1998 | Takashima et al. .............. 425/126.1 |

* cited by examiner

Primary Examiner—Tim Heitbrink
Assistant Examiner—Emmanuel S. Luk
(74) Attorney, Agent, or Firm—Katten Muchin Zavis

(57) ABSTRACT

An apparatus and method for providing targeted cooling to a pre-molded article, such as a preform. A cooling pin is inserted into the preform such that it makes contact with targeted area, such as the mold gate area. This permits conductive cooling of the targeted area. The apparatus and method are particularly suited to post-mold cooling in conjunction with a robotic take-out plate.

25 Claims, 6 Drawing Sheets

APPARATUS FOR LOCALIZED PREFORM COOLING OUTSIDE THE MOLD

FIELD OF THE INVENTION

The present invention relates to a method and apparatus for localized cooling of molded articles, such as preforms made of plastic resins. In particular, the present invention relates to a method and apparatus for localized cooling of a preform on a take-out plate, or like device.

BACKGROUND OF THE INVENTION

Beverage containers, and the like are commonly made by blow molding a parison, or preform, that is made from polyethylene teraphthalate (PET) material. Such PET reheat and blow preforms are commonly manufactured in an injection molding machine. Injection molding machines are typically equipped with a hopper that contains particulate thermoplastic polymer resin, usually in pellet form. The resin particles are fed to an extruder where they melt under the application of thermal and shear energy. The resulting molten resin is then fed to an injection nozzle and injected into a mold. Once the molded resin has set, or frozen, sufficiently, the resulting plastic article is ejected from the mold, and the process repeats.

Proper cooling of molded articles represents a very critical aspect of the injection molding process because it affects the quality of the article and the overall injection cycle time. Cooling is particularly critical in applications where semicrystalline resins are used, such as the injection molding of PET preforms. Lack of sufficient cooling, or too slow cooling, can lead to the development of crystallized regions in a preform. Typically, to avoid crystallinity problems, the PET resin must remain in the mold cavity space for cooling for a sufficient period of time to prevent formation of crystalline portions and to allow the preform to solidify before being ejected.

Two things typically occur if a preform is too rapidly ejected from a mold in order to reduce the cycle time of the injection process. The first is that the preform is not uniformly cooled. For example, the mold gate area is often crystallized. The gate area is prone to crystallization because the resin in the mold cavity space is still in contact with the hot stem of the hot runner injection nozzle during the cooling phase in the mold. Crystallinity in the mold gate area can weaken the quality of an article subsequently blown from the preform. Another critical area of a preform is the neck finish portion which in many instances has a thicker wall and thus retains more heat than the other portions. This neck portion needs aggressive post-mold cooling to prevent it from becoming crystallized, and to sustain further manipulations. Secondly, a preform ejected too quickly from the mold may be too soft and can thus be deformed during subsequent handling.

Many attempts have been made in the past to provide post-mold cooling. However, the prior art systems have not resulted in a significant improvement in the quality of the molded preforms or a substantial reduction of the cycle time. For example, U.S. Pat. No. 4,382,905 to Valyi discloses an injection molding machine where the molded preform is transferred to a first tempering mold for a first cooling step and then to a second tempering mold for a final cooling step. The tempering molds are provided with internal means for cooling the walls that contact the preforms. Valyi does not provide for cooling of the preforms during the transfer steps. The device taught by Valyi adds significant complexity to an injection molding machine and process, and increases the size of the molding machines.

U.S. Pat. No. 4,592,719 to Bellehache discloses an injection molding apparatus for fabricating PET preforms where molded preforms are removed from the injection cores by a transfer device. The transfer device includes vacuum suction to hold the preforms, and air absorption (convection) cooling of the outer surface of the preform. Further cooling is provided by circulating ambient air inside the preform and withdrawing it through a suction rod inserted into the preforms. The apparatus taught by Bellehache does not provide directed cooling to problem areas, such as the mold gate area, and suffers many of the disadvantages of the prior art, such as poor cooling uniformity, high cooling times, and a high potential for preform deformation.

U.S. Pat. No. 5,176,871 to Fukai teaches a post-injection preform cooling method and apparatus. The preforms are transferred to cooling tubes and cooling air is blown around the outside of the preform. Cooling cores are inserted into the preforms to prevent shrinkage. The cooling rods taught by Fukai do not provide localized cooling to prevent crystallinity, and merely increase the overall cooling of the preforms in the cooling tubes while preventing shrinkage.

U.S. Pat. No. 5,338,172 to Williamson discloses a closed circuit cooling system for post-mold cooling of preforms. The preform is inserted into a cooling tube, and a cooling probe is inserted inside the preform. A cooling fluid flows around the outside of the preform, and then circulates into the preform and is withdrawn though channels in the probe. This system uses expensive liquid nitrogen or carbon dioxide coolants, and does not provide targeted cooling to problem areas, such as the mold gate area.

Further reference is made to U.S. Pat. No. 5,085,822 to Uehara. Uehara teaches a blow mold that includes a stretch rod provided with cooling means. Generally, the preform must be heated, stretched and blown, and cooled in rapid succession. The cooling means in the stretch rod simultaneously provide the air to blow the preform and to cool it, but does not provide localized cooling to prevent the development of crystallinity in the original preform.

It is, therefore, desirable to provide a method and apparatus that can provide localized or targeted cooling to the areas that are prone to crystallinity. It is further desirable that this cooling be provided outside the mold cavity to decrease overall cycle time.

SUMMARY OF THE INVENTION

In a first embodiment of the present invention, there is provided an apparatus for providing targeted cooling to a molded article in a post-mold operation. The apparatus has a cooling pin that is shaped to have a targeting portion configured to conform to a targeted area on an inside surface of a partially cooled article. For example, the targeting portion can be an enlarged head at the end of the pin that conforms to the inside surface of the gate area of the preform. The targeting portion can also be an enlarged portion that fits conforms to to the interior of the neck finish portion of the preform. The apparatus also includes means to insert the cooling pin into the partially cooled article such that the targeting portion contacts the inside surface of the targeted area. Typically, the preforms will be carried on a take-off plate, and the cooling pins on a frame. The frame can then be moved towards the take-off plate such that the pins are inserted into the preforms until they contact the targeted area. The cooling pins can then be cooled, typically by circulating a cooling fluid therein, to conductively cool the targeted area.

In a further embodiment of the present invention, there is provided a cooling pin for an injection molding machine.

The cooling pin has a head portion configured to conform to an interior surface of a targeted area of a molded article, such as the interior of the gate region of the preform. The head portion is attached to a shaft such that it contacts the interior surface of the targeted area when inserted into the molded article. The pin can be conductively cooled to withdraw heat from the targeted portion. The cooling pin can also be provided with a further targeting portion that contacts a second targeted area. For example, the shaft can include an enlarged base portion that conforms to the interior surface of the neck finish of a preform. This permits simultaneous localized cooling of both the gate region and neck finish region.

In a further embodiment of the present invention, there is provided a method for providing localized cooling to a partially frozen molded article. The method begins by removing a partially frozen article from a mold. A conductive cooling device is then placed on a targeted area on an interior surface of the article. The conductive cooling device is a cooling pin, as described above. The cooling device is then conductively cooled, thereby selectively cooling the targeted area.

BRIEF DESCRIPTION OF THE DRAWINGS

Preferred embodiments of the present invention will now be described, by way of example only, with reference to the attached Figures, in which.

DETAILED DESCRIPTION

Figure 1:
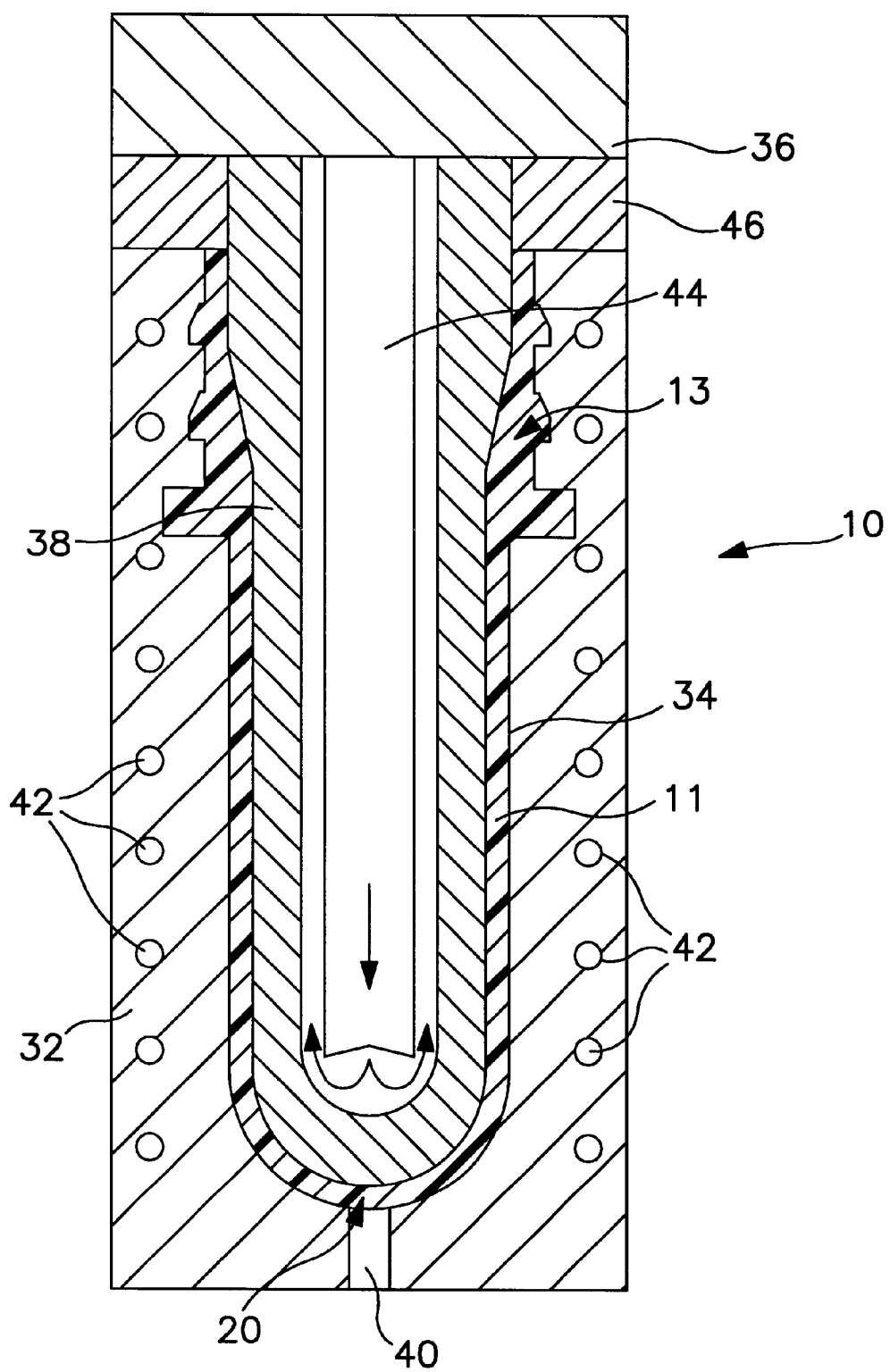
FIG. 1 shows a portion of a prior art mold section.

A portion of an injection mold is shown in FIG. 1, and generally indicated at 10. The illustrated portion of mold 10 shows a single mold cavity for forming one preform 11. As will be understood by those of skill in the art, a typical injection molding machine includes an array of such mold portions. Preform 11 has a neck finish portion 13. Neck finish portion 13 can be a problem area with respect to cooling due to its shape and thickness. Preform 11 also has a mold gate, or sprue gate, portion 20 that is commonly prone to crystallinity because it is the last portion of preform 11 to be formed, it remains in close contact to the hot gate area, as will be described further below, and, therefore, receives the least effective cooling while in mold 10.

Generally, mold 10 consists of a stationary mold half or plate 32 having an array of mold cavities 34 and a movable mold half or plate 36 having an array of mold cores 38. As is well known in the art, the mold cavity plate 32 is in fluid communication with a manifold plate (not shown) that receives molten material from an injection unit (not shown) of an injection molding machine. The mold cavities 34 receive the molten material from hot runner nozzles (not shown), such as for example a valve gated nozzle (not shown), through mold cavity gates 40. The mold cavities are each surrounded by cooling means for cooling the molten material in the cavity space formed by the mold core 38 and the mold cavity 34 when the mold plates 32 and 36 are in a mold closed position. The cooling means are preferably formed by cooling channels 42, embedded within the mold plate 32, that conduct a cooling fluid. The mold cores 38 and the mold cavities 34 form, in the mold closed position, a plurality of mold cavity spaces that are filled with molten material through a mold gate 40 during the injection step. The mold core 38 also includes means for cooling the molten material in the cavity space. The cooling means generally consist of a cooling tube 44 within each mold core 38. The mold core plate 36 further includes an ejector plate 46 which is used to remove the molded preforms 48 from the mold cores 38. The ejector plate 46 can be any suitable ejector plate known in the art.

As is well known to those of skill in the art, a preform is molded by closing the mold, injecting the molten material into the cavity space, initiating cooling of the cavity space, filling the cavity space, holding the molten material under pressure, performing final in-mold cooling, opening the mold, ejecting the articles or preforms from the cores and transferring the articles or preforms to a take-off plate. According to the present invention, any molten plastic, metal or ceramic material can be injected into the mold cavity space and cooled into a desired article using the mold system of FIG. 1. In a preferred embodiment of the current invention, the molten material is PET and the molded article is preform 11. According to the present invention however, the molded article can also be a preform made of more than one material, such as for example virgin PET, recycled PET and an appropriate barrier material such as for example EVOH.

According to the present invention, in order to reduce the overall cycle time, the residence time of preform 11 in mold 10 is minimized. A reduced residence time in mold 10 reduces the in-mold cooling time, which can result in articles that are not sufficiently and uniformly cooled by the cooling means 42 and 44. The amount of heat retained by the article or preform after being cooled inside the mold for a reduced time and immediately after opening the mold is very significant and depends on the thickness of the molded article or preform. This internal heat has well known potential to generate crystallized portions at gate area 20 of the molded article or preform, neck finish portion 13 of the molded article or preform, or the entire preform.

Figure 2:
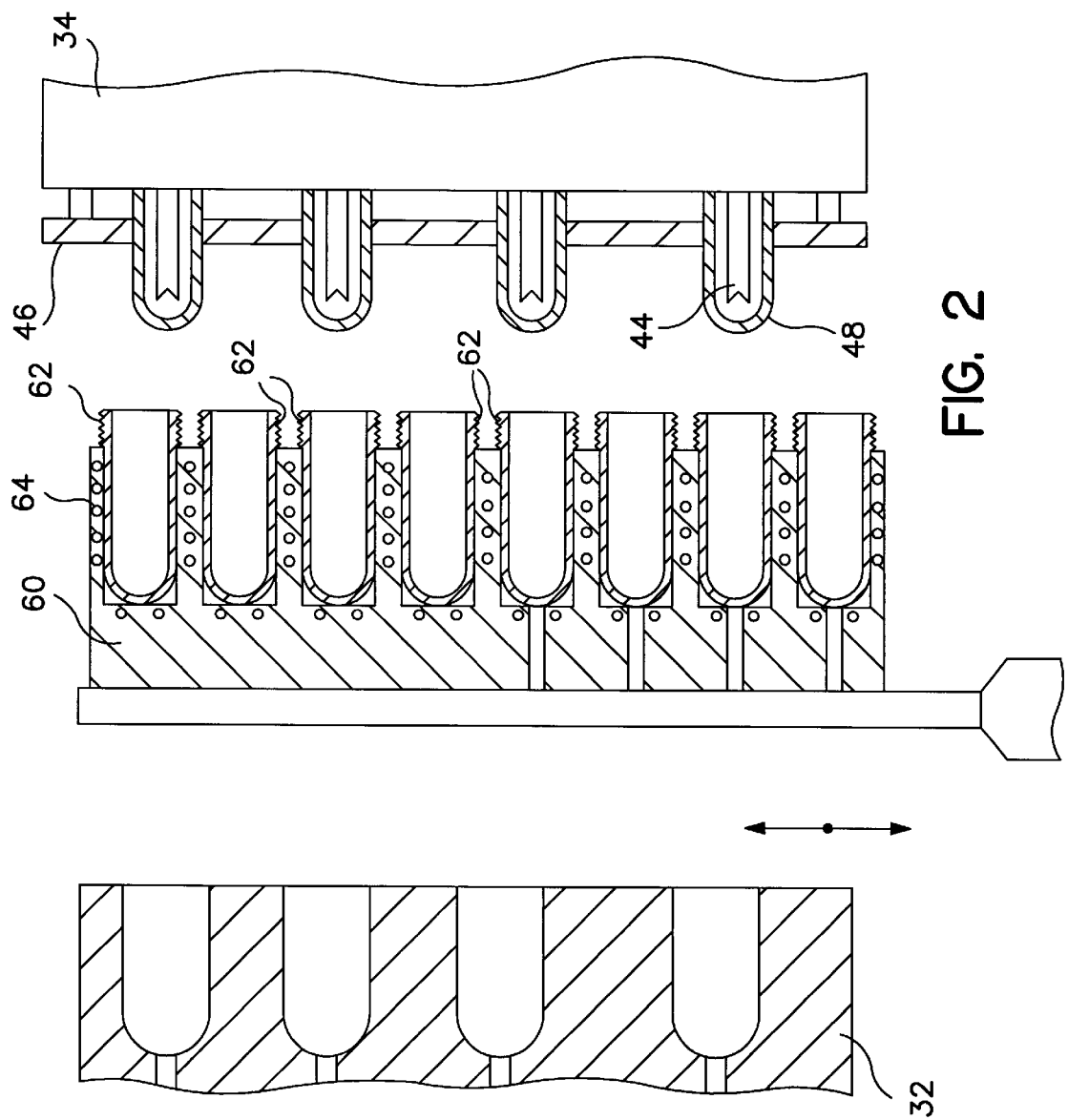
FIG. 2 shows the insertion of a take-out plate between open mold halves in an injection molding machine.

FIG. 2 illustrates an embodiment of a robot take-off plate 60 which can be used in the cooling method of the present invention. The take-off plate 60 includes a plurality of hollow holders or receptacles 62 which can be water cooled tubes. Typical take-off plates which may be used for the take-off plate 60 are shown in U.S. Pat. No. 5,447,426 to Gessner et al. and in U.S. Reissue Pat. No. RE 33,237 to Delfer, III, both of which are incorporated by reference herein. In operation, the mouth of a plurality of holders 62 are aligned with the mold cores 38 of the mold plate 36. Transfer of the molded articles 48 to the holders 62 is effected by operation of the ejector plate 46. According to the present invention, the take-off plate 60 can be provided with a number of holders 62 equal to the number of mold cores 38 or a larger number of holders 62 such as a multiple of the number of mold cores, for example three or four times the number of mold cores. By having more holders 62 than the number of cores 38, it is possible to retain some of the molded articles for a time longer than a single molding cycle and thereby increase the cooling time while maintaining a high output of molded articles. The method of the present invention can be carried out irrespective of the relative number of molded articles retained, by the holders 62. Nevertheless, in the preferred embodiment of the invention, the robot take-off plate 60 has a number of holders 62 which represent three times the number of cores 38. This means that the take-off plate 60 does not always carry a number of preforms or molded articles equal to the number of holders 62. This also means that a single batch of preforms can be moved back more than once into the mold area between the mold core and cavity plates 32 and 36 to pick up other batches of molded articles, while being cooled by intimate contact between the hollow tubes 64 within the take-off plate, which tubes 64 carry a cooling liquid such as water, and the external wall of preforms 11 as shown in more detail in the aforementioned U.S. Pat. No. 5,447,426. The heat transfer between the tubes 64 and the hot molded articles released from the mold 10 is performed through conduction. Generally, any solid material incorporating any cooling means can be used and brought into intimate contact with the exterior wall of the molded articles to cool the exterior of the molded articles. By using a cooling system based on heat transfer through conduction implemented through an intimate contact between the molded article or preform and the cooling means, the shape of the article or preform is maintained without deformations or scratches caused by handling.

If desired, the conductive cooling tubes 64 employed in the take-off plate can be replaced by a convective heat transfer means. Any suitable convective heat transfer means known in the art may be used with the take-off plate 60 to effect cooling of the exterior surfaces of the molded articles or preforms 11 carried by the take-off plate 60.

Figure 3:
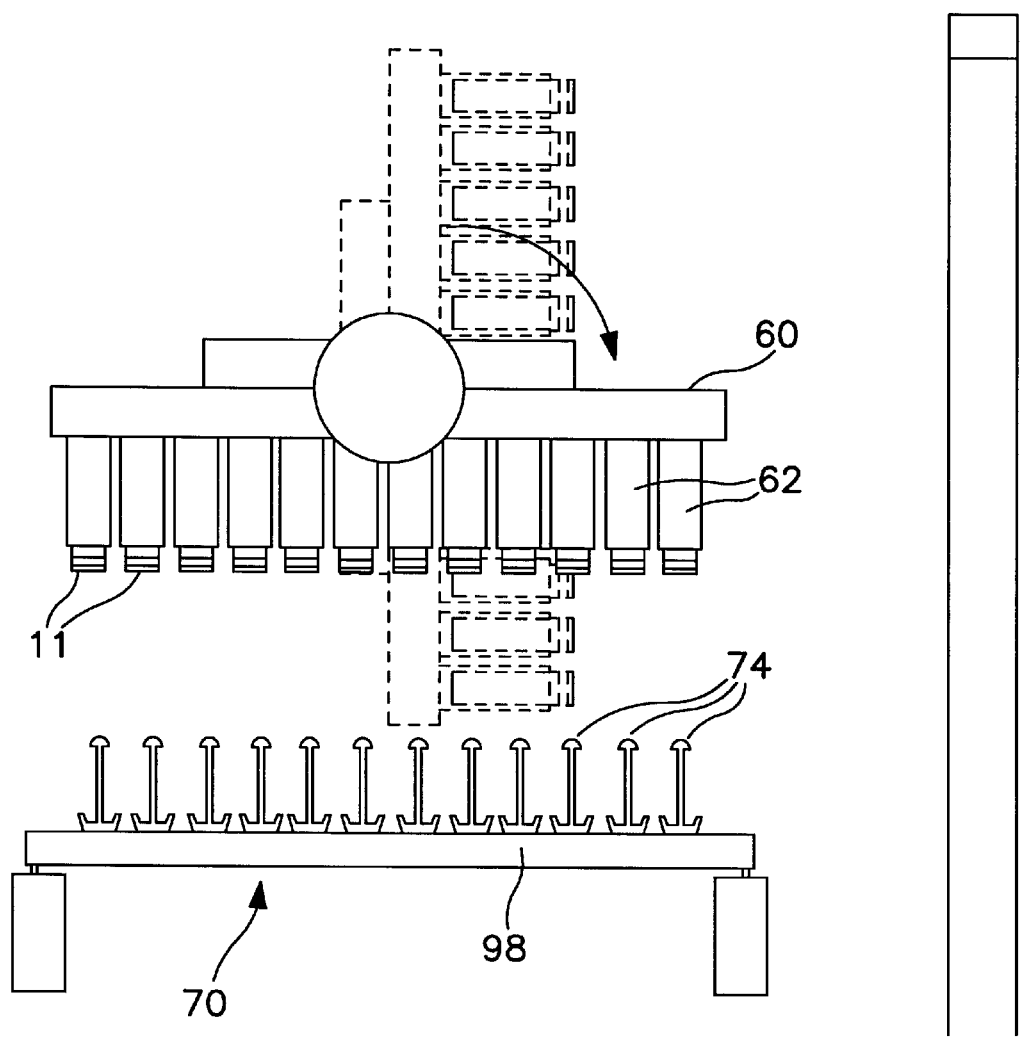
FIG. 3 shows a take-out plate, in an open position, according to the present invention.
Figure 4:
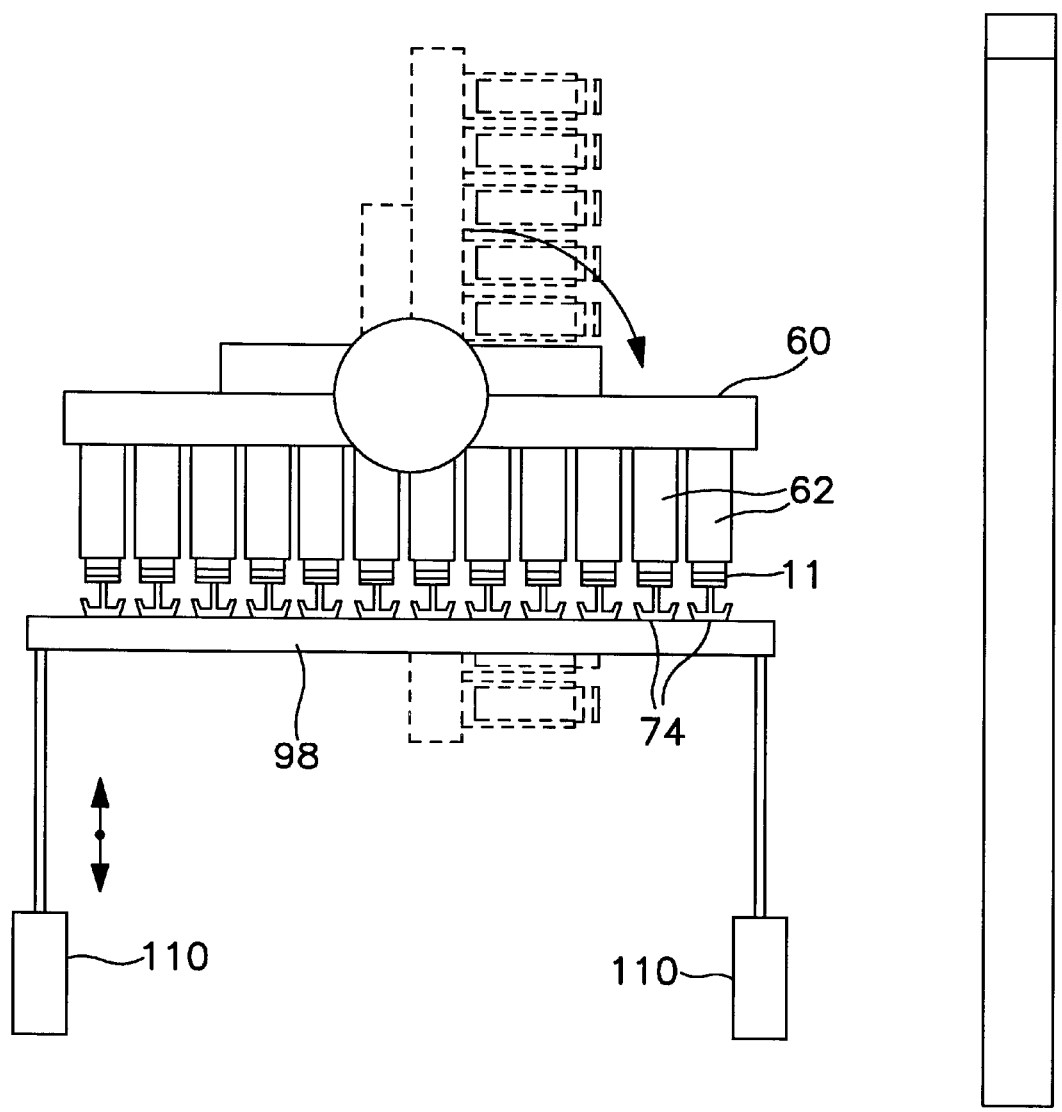
FIG. 4 shows a take-out plate, in a closed position, according to the present invention.

Referring now to FIGS. 3 and 4, a cooling device 70, in accordance with the present invention, is shown in conjunction with robot take-off plate 60. Cooling apparatus 70 can enhance the post-mold cooling efficiency by allowing simultaneous cooling of the interior and exterior surfaces of the molded articles or preforms 11 by conductive heat transfer. This can reduce the cycle time and improve the quality of preforms 11. Cooling apparatus 70 consists of an array of elongated cooling pins 74 that can provide conductive cooling to targeted areas of interest in the preform. In a preferred embodiment of the present invention, the internal cooling is targeted to gate portion 20 of the molded articles or preforms 11, where crystallinity most often occurs. As used herein, a targeted area is any portion of a preform that has been determined to be prone to the development of crystallinity or other cooling problems. Take-out plate 60 provides cooling, as described above, to the exterior of preforms 11. In this preferred embodiment, cooling pins 74 are cooled by introducing a cooling fluid into their core. The cooling fluid could be any appropriate coolant, such as for example a liquid or a gas, such as air, nitrogen or carbon dioxide.

Figure 5:
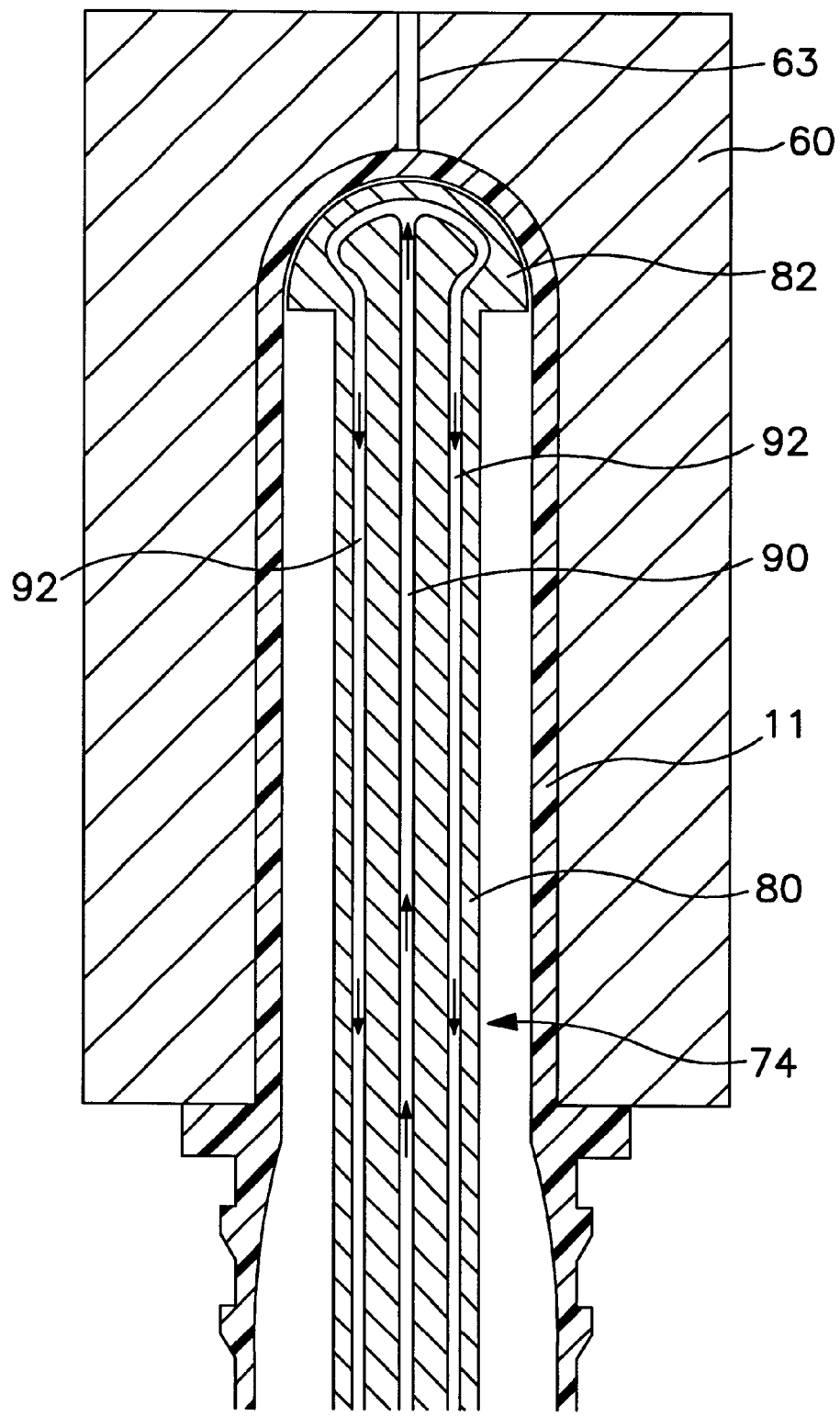
FIG. 5 shows a first embodiment of a cooling pin, according to the present invention, inserted into a preform held in a take-out plate.

FIG. 5 illustrates a first embodiment of a cooling pin 74, in accordance with the present invention, positioned within a preform or molded article 11 being cooled. The cooling pin 74 is inserted inside preform 11 such that it makes contact with the interior of gate portion 20, to provide localized or targeted cooling to this area of the preform. As shown in FIG. 5, cooling pin 74 is positioned centrally within the preform or molded article, such that its central axis is aligned with the central axis of preform 11.

Cooling pin 74 consists of a shaft 80 formed from any suitably thermally conductive material, such as steel, aluminum or copper. If desired, shaft 80 can be made from a porous material so that additional coolant can be spread in a very uniform manner on areas of a preform other than the gate portion 20. The inventors of the present invention currently contemplate that the pin can be made of a porous aluminum for this purpose. An enlarged head 82 is formed at the distal end of shaft 80. Head 82 can be made of any suitable thermally conductive material, such as steel, aluminum or copper. Head 82 is shaped to configure to the interior dimensions of gate area 20 of preform 11. When pin 74 is inserted in preform 11, head 82 makes contact with the interior surface of gate area 20 to permit conductive heat transfer in this area. Cooling pin 74 has a coolant channel 90 that communicates with a source of cooling fluid (not shown). The desired coolant fluid flows into cooling pin 74 along channel 90, and returns via channels 92. The coolant cools pin 74, and transfers heat away from head 82. The supply of the coolant can be controlled by suitable valves, or other means, as are described in co-assigned U.S. patent application Ser. No. 09/119,256, the contents of which are incorporated herein by reference.

Figure 6:
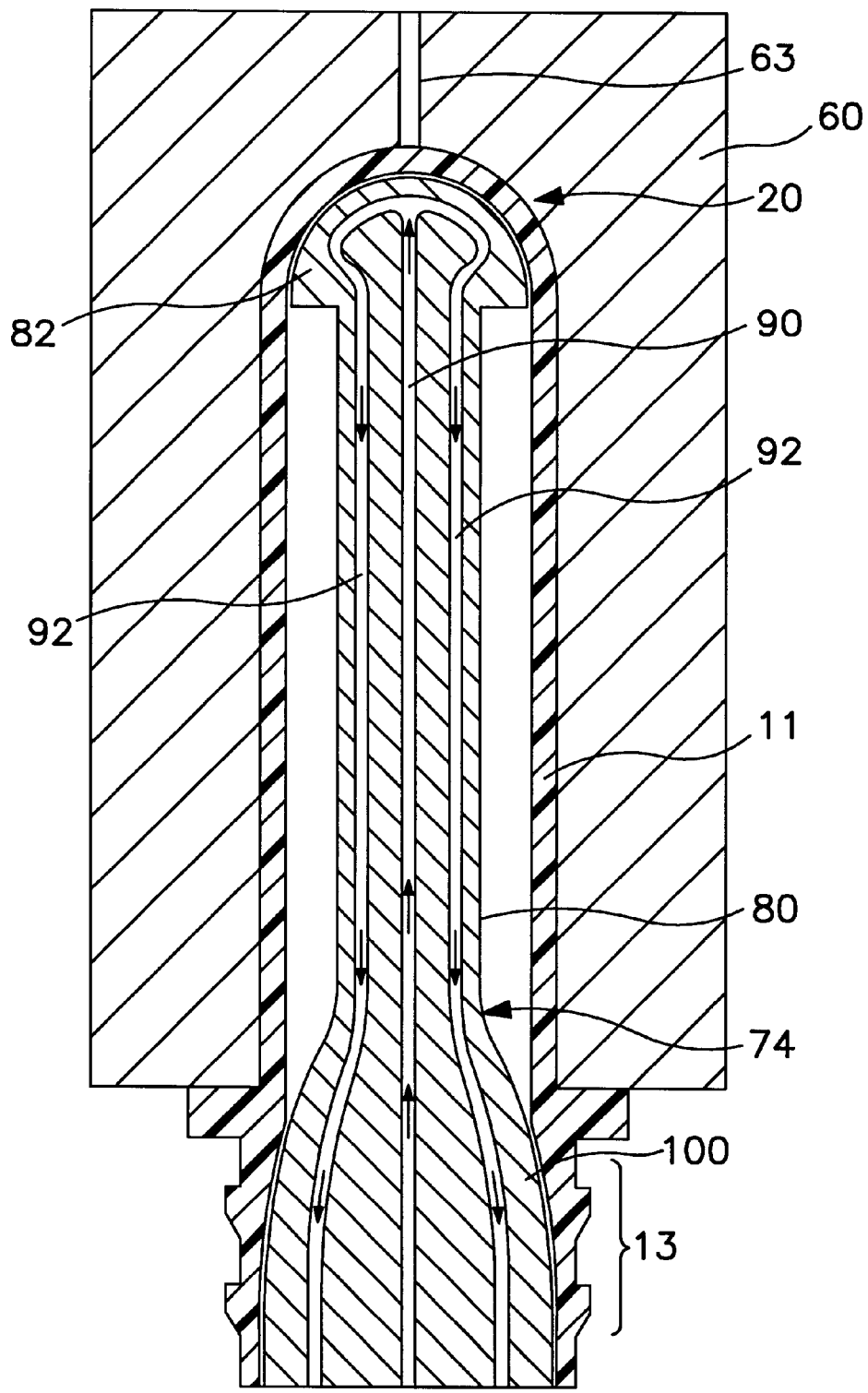
FIG. 6 shows a second embodiment of a cooling pin inserted into a preform held in a take-out plate.

FIG. 6 illustrates a further embodiment of a cooling pin 74 according to the present invention. In this embodiment, cooling pin 74 includes an enlarged base portion 100 that is configured to conform to the interior surface of neck finish portion 13. Base portion 100 permits targeted conductive heat transfer to be furnished to neck finish portion 13, as well as the localized cooling that is supplied to gate portion 20 by head 82.

In a preferred embodiment of the present invention, cooling pin 74 concentrates cooling at gate portion 20 of the molded article 11 and thus aggressively focuses, localizes, or targets cooling fluid to this region. In this way, molded articles such as preforms can be formed free of crystallized areas in the sprue gate portion 20.

The method of the present invention will now be described with reference to FIGS. 3, 4 and 5. An array of cooling pins 74 is mounted onto a cooling frame 98 which can be made of a lightweight material such as aluminum. According to the present invention, the cooling frame 98 can be operated in either a vertical or a horizontal position. In both cases, the frame 98 is movable towards take-off plate 60 when take-off plate 60 reaches its final out of mold position. Any suitable means known in the art may be used to move the frame 98 at a relatively high speed so that cooling pins 74 can be quickly introduced inside the molded article. In a preferred embodiment of the present invention, the frame 98 is moved using cylinders (not shown). According to the present invention, the number of cooling pins 74 can be equal to or less than the number of receptacles 62 in take-off plate 60. According to the present invention, take-off plate 60 is provided with means for holding the molded articles or preforms 11 within the receptacles 62 such as suction provided through channel 63, and with means for ejecting preforms 11 from take-off plate 60.

While the operation of the present invention has been described as having cooling pins 74 supported on a movable frame 98, it is fully within the contemplation of the present inventors that the pins 74 can be mounted on a fixed frame, and take-off plate 60, holding preforms 11, can be moved to engage with cooling pins 74.

According to one embodiment of the present invention, the cooling pins 74 enter the preforms retained by the take-off plate 60 in multiple steps, and at each step the preforms that are molded at different times are at different temperatures. In order to optimize the overall cooling step, during the first step of cooling the preforms are very hot and thus a maximum amount of cooling is delivered by pins 74 to the targeted area(s). In the second and the subsequent steps, the amount of cooling provided by pins 74 can be reduced. In order to further optimize the cooling process, any known suitable temperature sensors, such as thermocouples, can be used to measure the temperature of preforms 11 before and after cooling them so that adjustments of the cooling rate can be done without interrupting the molding cycle. In a preferred embodiment, thermocouples (not shown) connected to some cooling control means (not shown) are located in the take-off plate 60 adjacent to each preform. By monitoring the temperature of each preform, some adjustments can be made to the amount of coolant delivered to cooling pins 74 or to certain cooling pins 74. This may also compensate for any cooling inefficiencies or non-uniformity of the conduction cooling means located in the take-off plate.

Preforms 11 are cooled in the mold until they are frozen, or solidified, sufficiently to be transferred. Generally, this point occurs once the preforms have developed a solid "skin" on their interior and exterior surfaces, such that they will not appreciably deform when they are transferred to take-out plate 60. The mold is opened and the take-off plate 60 is moved into the molding area between the mold core plate 36 and the mold cavity plate 32. The preforms are transferred to take-out plate 60, typically by suction means within the tubes in take-out plate 60. Relative movement between the mold core and mold cavity plates can then be performed in any manner, as is well known in the art, using any suitable means. After the take-off plate 60 reaches the out of the mold position, the cooling pins 74 carried on plate 98 are inserted into the molded articles for cooling, such that they make contact with the desired target area, such as the gate area 20 of each article or preform 11. Coolant is then circulated through pins 74 to conductively draw heat from the interior surface of gate area 20.

According to another embodiment of the invention, the take-off plate may include external cooling means using blown air or may include no cooling means. In both cases, internal cooling is achieved using the novel cooling method and apparatus of the present invention.

The innovative cooling method and apparatus of the present invention are extremely beneficial for cooling preforms molded in high cavitation molds. It is well known that the temperature of the molten resin flowing through a mold varies quite substantially for a various of reasons including: (a) non-uniform heating of the hot runner manifold; (b) formation of boundary layers inside the manifold's melt channels; (c) non-uniform mold cavity cooling; and (d) insufficient cooling at the mold gate area. One consequence of the temperature variations across the mold is that the cooling time has to be adjusted at the local level so that the hottest preforms are cooled before any crystallinity occurs in the final preforms. In order to prevent formation of crystallized zones, the cooling system of the present invention is able to provide targeted or localized internal cooling to desired areas of a preform that are especially prone to the development of crystallinity. Another consequence of the non-uniform temperature inside the mold is that in most cases the gate sprue area of the preforms is the hottest part of the molded preform. Because this sprue gate portion is more slowly cooled in the mold closed position, chances are that this portion will be highly crystalline if the in-mold cooling is too long or if no additional cooling is provided outside the mold. According to the present invention, the cooling pins 74 conductively cooling the inside of the preform immediately adjacent the gate area to prevent the formation of crystallized areas in the preform.

The innovative cooling method and apparatus of the present invention are also advantageously compensate for the cooling inefficiency of the take-off plate. Due to the imperfect contact between the hot molded article and the cooling tube, the temperature of the molded article held by the take-off plate may vary across the plate. According to the present invention, temperature sensors located in the take-off plate or the cooling frame can be used to provide information to a controller to control coolant supply to individual cooling pins 74.

The configuration of head 82 and base portion 100 can also prevent undue shrinkage of preform 11 during the cooling phase. The direct contact provided to the targeted areas can also hold preform 11 against the inside of the cooling tubes on the take-out plate.

A further benefit is a significant reduction of the cycle time. Increasing the post-mold cooling efficiency can simplify the design and the movements of the take-off plate and the cooling frame.

It will be apparent to those skilled in the art that the foregoing is by way of example only. Modifications, variations and alterations may be made to the described embodiments without departing from the scope of the invention which is defined solely in the claims.

We claim:

1. An apparatus for providing targeted cooling to a molded article in a post-mold operation, comprising:
   a cooling pin, disposed apart from the mold and having a targeting portion configured to conform to a targeted area on an inside surface of a partially cooled article outside the mold, the targeting area comprising less than the entire inside surface of the partially cooled article;
   means, disposed apart from the mold, to insert the cooling pin into the partially cooled article outside the mold such that the targeting portion contacts the corresponding inside surface of the targeted area; and
   means to cool the pin to conductively cool the targeted area.

2. An apparatus according to claim 1, wherein the cooling pin is adapted to cool an article which comprises a preform.

3. An apparatus according to claim 2, wherein the cooling pin is adapted to cool a preform which is formed of polyethylene teraphthalate.

4. An apparatus according to claim 2, wherein the preform is carried on a transfer mechanism.

5. An apparatus according to claim 4, wherein the transfer mechanism includes a take-out plate.

6. An apparatus according to claim 2, wherein the targeted area includes a gate portion of the preform.

7. An apparatus according to claim 2, wherein the targeted area includes a neck finish portion of the preform.

8. An apparatus according to claim 4, wherein the transfer mechanism carries the preform into engagement with the cooling pin.

9. An apparatus according to claim 1, wherein the cooling pin is carried on a frame.

10. An apparatus according to claim 9, wherein the frame is powered to move the cooling pin toward the article.

11. An apparatus according to claim 1, wherein the cooling pin is provided with cooling channels.

12. An apparatus according to claim 11, wherein a cooling fluid circulates through the cooling channels to cool the pin.

13. An apparatus according to claim 1, wherein the cooling pin is formed of a thermally conductive material.

14. An apparatus according to claim 12, wherein the cooling pin is formed of steel.

15. An apparatus according to claim 12, wherein the cooling pin is formed of copper.

16. An apparatus according to claim 12, wherein the cooling pin is formed of aluminum.

17. An apparatus according to claim 16, wherein the aluminum is a porous aluminum.

18. Apparatus for cooling an injection-molded plastic preform after it is removed from a mold, comprising:

a cooling pin disposed outside the mold and having at least one interior passage for circulating a cooling medium inside said cooling pin, said cooling pin having an enlarged head for cooling a head portion of the plastic preform outside the mold, the enlarged head comprising less than an entire outer surface of the cooling pin; and take-off structure which removes the plastic preform from the mold and places it over said cooling pin to cause said cooling pin enlarged head to cool the plastic preform head portion.

19. Apparatus according to claim 18, wherein said take-off structure includes cooling structure which cools an outside surface of the plastic preform.

20. Apparatus according to claim 18, wherein said cooling pin further comprises an enlarged base portion which cools a corresponding base portion of the plastic preform.

21. Apparatus for cooling a plurality of plastic injection-molded preforms outside a mold, comprising:

a plurality of cooling pins disposed outside the mold to cool a corresponding plurality of plastic preforms after a molding operation, each cooling pin having a surface which varies to cool a predetermined targeted area of the corresponding plastic preform outside the mold, each cooling pin having internal structure for circulating a cooling fluid inside said cooling pin, the targeted area of each preform comprising less than an entire inner surface of the preform; and take-off structure which removes the plurality of plastic preforms from the mold and places them over said plurality of cooling pins outside the mold, to cause said plurality of cooling pins to cool the predetermined targeted areas of the corresponding plastic preforms.

22. Apparatus according to claim 21, wherein the surface which varies in each cooling pin comprises an enlarged head.

23. Apparatus according to claim 21, wherein the surface which varies in each cooling pin comprises an enlarged base.

24. Apparatus according to claim 21, wherein said take-off structure comprises a plurality of holders each of which cools an outside surface of a corresponding plastic preform.

25. Apparatus according to claim 24, wherein a number of holders on said take-off structure is greater than a number of preform cavities in the mold.

* * * * *